July 22, 1952   M. C. COOK   2,604,020
KEY-CUTTING ATTACHMENT FOR LATHES
Filed Feb. 23, 1950   2 SHEETS—SHEET 1
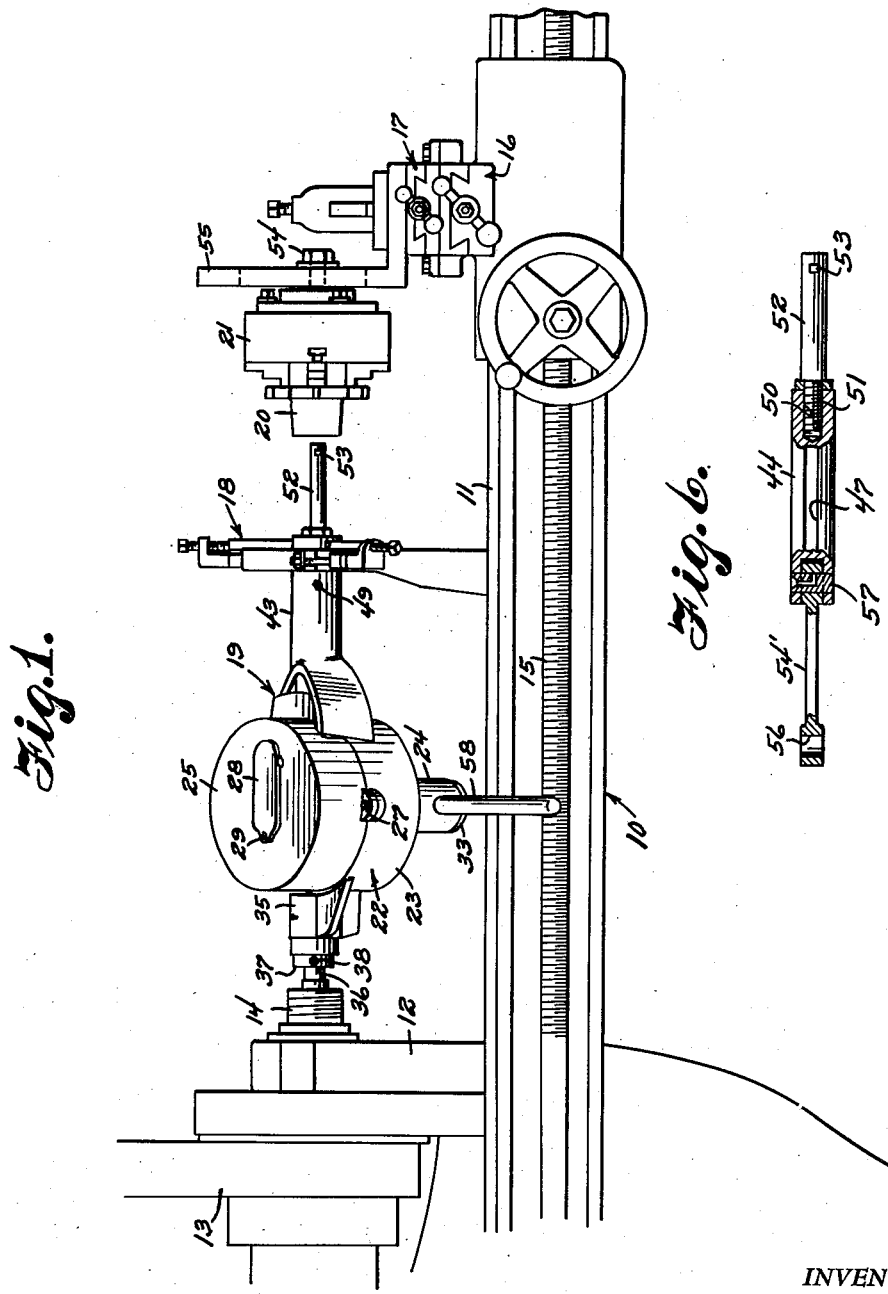
INVENTOR.
Martin C. Cook
BY Victor J. Evans & Co.
ATTORNEYS July 22, 1952 M. C. COOK 2,604,020
KEY-CUTTING ATTACHMENT FOR LATHES
Filed Feb. 23, 1950 2 SHEETS—SHEET 2
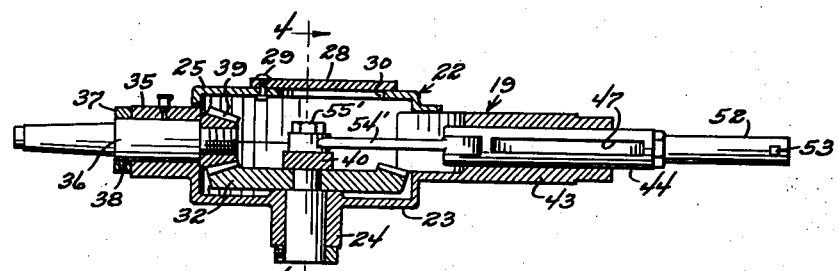
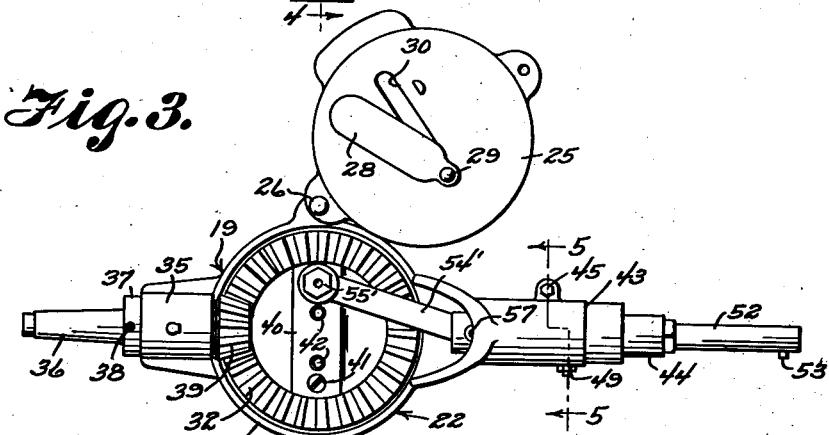
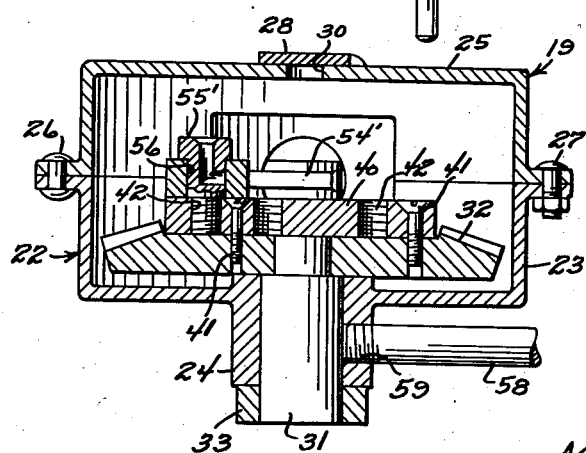
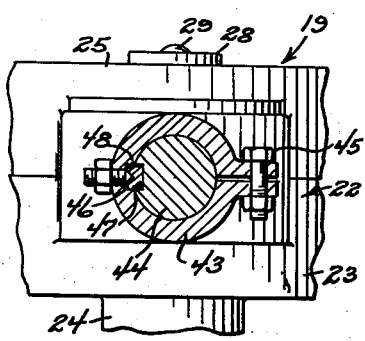
INVENTOR.
Martin C. Cook
BY Victor J. Evans & Co.
ATTORNEYS Patented July 22, 1952

2,604,020

UNITED STATES PATENT OFFICE 2,604,020

KEY-CUTTING ATTACHMENT FOR LATHES

Martin C. Cook, Klamath Falls, Oreg.

Application February 23, 1950, Serial No. 145,645

1 Claim. (Cl. 90—40)

This invention relates to lathes, and more particularly to a key-cutting attachment for lathes.

The object of the invention is to provide a mechanism which is adapted to be attached to lathes whereby keyways or key seats can be efficiently cut in gears, sleeves, hubs and other articles.

Another object of the invention is to provide a key-cutting attachment which is portable and adapted to be used on various makes and sizes of lathes, the moving parts of the attachment being enclosed so as to prevent dirt or other foreign matter from damaging or contaminating these parts.

A further object of the invention is to provide a lathe key-cutting attachment which is extremely simple and inexpensive to manufacture.

Other objects and advantages will be apparent during the course of the following description.

In the accompanying drawings forming a part of this application, and in which like numerals are used to designate like parts throughout the same:

Figure 1 is a front elevational view showing a lathe having the key-cutting attachment of the present invention attached thereto;

Figure 2 is a longitudinal, sectional view taken through the key-cutting attachment;

Figure 3 is a top plan view of the key-cutting attachment, with the cover in open position;

Figure 4 is an enlarged sectional view taken on the line 4—4 of Figure 2;

Figure 5 is an enlarged sectional view taken on the line 5—5 of Figure 3;

Figure 6 is an elevational view, with parts broken away and shown in section, showing the connection of the link, rod and cutter bar.

Referring in detail to the drawings, the numeral 10 designates a portion of a conventional lathe which includes a bed 11, a head stock 12 and a belt-and-pulley mechanism 13 which serves to rotate the usual spindle 14. The lathe 10 further includes a threaded shaft 15 which extends longitudinally along the front of the bed 11, and there is also provided the usual cross-slide 16 which serves to support the compound slide 17. A vertically disposed steady rest 18 projects upwardly from the bed 11, Figure 1.

The present invention is directed to a keyway cutter assembly which is designated in its entirety by the numeral 19, and the assembly 19 of the present invention is adapted to be used for cutting keyways or key seats in an article or work piece 20 which is held in its proper position by the chuck 21.

The key-cutting assembly includes a hollow housing 22 which includes a bottom section 23 that has a bushing 24 depending from the bottom thereof. The housing 22 further includes a top section or cover 25. A suitable rivet or pin 26 serves to hingedly connect one side of the cover 25 to the bottom section 23 of the housing 22, and a bolt-and-nut assembly 27 is used to maintain the top section or cover 25 closed on the bottom section 23. Thus, when the key-cutting mechanism is being used, the top section 25 is in the position shown in Figures 1, 2 and 4, but when the user desires to inspect or adjust the parts arranged in the housing 22, the bolt-and-nut assembly 27 is first removed, whereby the top section 25 can be swung or pivoted to the position shown in Figure 3. The housing 22 thus serves to insure that the various moving parts enclosed therein will not be contaminated or damaged by dirt, chips of metal or other foreign matter. The top of the section 25 is provided with a slit 30 whereby oil can be placed on the moving parts in the housing 22 so as to lubricate the parts. A movable element 28 is pivotally connected to the top section 25 by a pin 29, and this element 28 normally closes the slit 30.

Projecting through the bushing 24 and into the housing 22 is a bearing shaft 31 which has a first gear 32 mounted on its inner end, the gear 32 being arranged in the housing 22. A ring member 33 is mounted on the lower end of the shaft 31, and the member 33 is maintained in its proper position on the shaft 31 by a set screw 34.

Projecting from one side of the bottom section 23 and formed integrally therewith or secured thereto is a hollow collar or sleeve 35, Figure 2. A drive shaft 36 is rotatably supported in the collar 35 and the outer end of the drive shaft 36 is adapted to be arranged in engagement with the spindle 14 so that actuation of the spindle 14 causes rotation of the drive shaft 36. A ring member or bushing 37 is arranged on the drive shaft 36 and abuts the collar 35, there being a set screw 38 for maintaining the bushing 37 in engagement with the drive shaft 36. Mounted on the inner end of the drive shaft 36 is a gear 39 which has its teeth arranged in meshing engagement with the teeth of the gear 32. Thus, rotation of the drive shaft 36 causes rotation of the gear 32.

Extending across the top of the gear 32 and connected thereto is a plate 40, the plate 40 being connected to the gear 32 by suitable securing elements, such as bolts or screws 41. Thus, as the gear 32 is rotated, the plate 40 is rotated therewith. The plate 40 is provided with a plurality of spaced interiorly threaded openings 42, Figure 4.

Arranged exteriorly of the housing 22 is a hollow casing 43, and slidably or reciprocably mounted in the casing 43 is a ram or rod 44. A bolt-and-nut assembly 45 adjustably connects the free ends of the casing 43 together, Figure 5, so that by tightening the bolt-and-nut assembly 45, the user can compensate for any wear that occurs on the inside of the casing 43 or on the exterior of the rod 44. For preventing rotation or turning of the rod 44, a guide strap 46 is seated in a cutout or channel in the rod 44, and the guide strap 46 also engages or seats in a similar cut-out or channel 48 in the casing 43. A set screw assembly 49 projects through the casing 43 and into engagement with the strap 46 for maintaining the strap 46 under proper tension.

One end of the rod 44 is provided with an interiorly threaded bore 50, and the threaded end 51 of a cutter bar 52 is arranged in threaded engagement with the bore 50. The cutter bar 52 is provided with a cutter or tool 53 on its free end, Figure 6, so that as the cutter bar 52 is closed to reciprocate back and forth, a keyway or key seat can be cut in the work piece or article 20. The work piece 20 is held in its proper position by means of a chuck 21 and a bolt-and-nut assembly 54 serves to adjustably or detachably connect the chuck 21 to an L-shaped plate 55, Figure 1. The vertical portion of the plate 55 is preferably provided with an elongated, vertically disposed slot through which projects the bolt-and-nut assembly 54, whereby the chuck 21 can be adjusted vertically as desired.

The casing 43 projects through the steady rest 18 of the lathe 10 so as to insure that the cutter bar 52 is properly aligned with respect to the work piece 20. The casing 43 is preferably formed as an integral part of the bottom section 23 of the housing 22.

For connecting the rod 44 to the plate 40, a link 54 is provided. Thus, a suitable securing element, such as a connecting pin or bolt 55, projects through an aperture or opening 56 in one end of the link 54 and is then arranged in engagement with one of the threaded apertures 42. A suitable securing element, such as a pin 57, serves to pivotally connect the other end of the link 54 to the bifurcated end of the rod 44, Figure 6. By properly positioning the bolt 55 in engagement with the opening 42, the length of the stroke of the link 54 can be adjusted as desired. An arm 58 has its inner end threaded exteriorly, as at 59, and the threaded end 59 is arranged in engagement with the bushing 24. The arm 58 projects from the bushing 24 and engages the lathe bed 11 so as to steady the key-cutting mechanism and prevent rotation of the mechanism during the use thereof.

In use, the parts are assembled so that they occupy the positions shown in Figure 1. Then, upon actuation of the spindle 14 by means of the belt-and-pulley mechanism 13, the drive shaft 36 will be rotated and this in turn will result in rotation of the gear 32, since the gears 39 and 32 are arranged in meshing engagement with each other. This rotation of the gear 32 causes a corresponding rotation of the plate 40 which in turn causes the rod 44 to reciprocate in the casing 43, since the link 54 pivotally connects the rods 44 to the plate 40. Then, since the cutter bar 52 is connected to the rod 44, the cutter will cause a keyway or key seat to be formed in the work piece 20.

The mechanism of the present invention can be readily adapted for various makes and sizes of lathes without being redesigned. The attachment of the present invention can be adjusted to cut a keyway in a hole with an extreme taper. Also, the housing 22 encloses the meshing gears and other moving parts, whereby these parts will not be contaminated or damaged by foreign matter. To use the mechanism of the present invention on a lathe, it is only necessary to remove the chuck 21 from the lathe and then connect it to the plate 55 so that the work piece 20 can be held at the desired height. Then, the steady rest 18 is mounted on the lathe bed and the drive shaft 36 is connected to the spindle 14, the casing 43 being supported in the steady rest 18. Next, the cutter bar 52 is connected to the rod 44 and the compound and cross-slide 17 and 16 are adjusted to the desired positions for feeding the work. The arm 58 serves to insure that the mechanism will not turn during use and then upon actuation of the spindle the cutter bar 52 will form the keyway or key seat in the work piece 20.

The mechanism of the present invention can be manufactured easily and inexpensively and can be assembled and made ready to be used in a few minutes. Any size of cutter bar can be used with the mechanism, depending upon the size of the keyway to be cut in the work piece.

I claim:

A key-way cutter comprising a hollow housing, said housing including a bottom section provided with a depending bushing, a top section hingedly connected to said bottom section, there being a slit in said top section, an element for normally closing said slit, a bearing shaft projecting through said bushing, a bolt and nut assembly for maintaining said top section closed on said bottom section, a first gear arranged in said bottom section and connected to said bearing shaft, a ring member mounted on the lower end of said shaft, a collar projecting from one side of said bottom section, a drive shaft rotatably supported in said collar and having one end adapted to be arranged in engagement with a spindle, a bushing arranged on said drive shaft and abutting said collar, a second gear mounted on the inner end of said drive shaft and arranged in meshing engagement with said first gear, a hollow casing including a pair of sections detachably connected together, said casing projecting from one side of said housing, a rod reciprocably arranged in said casing, a plate extending across the top of said first gear and adjustably mounted on said first gear, said plate being provided with a plurality of spaced interiorly threaded openings, a link pivotally connecting said plate to said rod, a cutter bar having one end connected to said rod, there being a longitudinally extending cut-out in said rod, said casing being provided with a channel arranged in registry with said cut-out, a guide strap seated in said channel and cut-out, and a set screw extending through said casing and engaging said strap, one end of said rod being provided with an interiorly threaded bore for receiving the threaded end of the cutter bar, the stroke of said link being adjustable, and an arm having its inner end threadedly engaging said last-named bushing for steadying the key-cutter.

MARTIN C. COOK.

REFERENCES CITED

The following references are of record in the file of this patent:

UNITED STATES PATENTS

| Number | Name | Date |
| --- | --- | --- |
| 443,847 | Ewald | Dec. 30, 1890 |
| 968,489 | Milne | Aug. 23, 1910 |
| 1,202,636 | Aab | Oct. 24, 1916 |
| 1,506,108 | Brophy | Aug. 26, 1924 |
| 2,408,876 | Pigott et al. | Oct. 8, 1946 |
| 2,516,224 | Ludeman | July 25, 1950 |
| 2,532,591 | Armitage et al. | Dec. 5, 1950 |

FOREIGN PATENTS

| Number | Country | Date |
| --- | --- | --- |
| 8,720 | Great Britain | Nov. 25, 1940 |